United States Patent [19]

Higashihara et al.

[11] Patent Number: 4,530,073
[45] Date of Patent: Jul. 16, 1985

[54] DISC REPRODUCING APPARATUS

[75] Inventors: Teruaki Higashihara, Tokyo; Tadao Yoshida, Kanagawa; Hideo Kawachi, Chiba; Chiaki Nonaka, Kanagawa, all of Japan

[73] Assignee: Sony Corporation, Tokyo, Japan

[21] Appl. No.: 409,022

[22] Filed: Aug. 17, 1982

[30] Foreign Application Priority Data

Aug. 25, 1981 [JP] Japan ............................. 56-133082

[51] Int. Cl.³ .......................... G11B 7/00; H04N 5/76
[52] U.S. Cl. ........................................ 369/50; 369/59; 360/39
[58] Field of Search ...................... 369/50, 59; 360/32, 360/39

[56] References Cited

U.S. PATENT DOCUMENTS 4,224,480 9/1980 Satoh et al. ........................... 369/50
4,358,796 11/1982 Ceshkovsky et al. ............ 369/50 X
4,414,668 11/1983 Iwasaki ................................ 369/50 X Primary Examiner—Aristotelis M. Psitos
Attorney, Agent, or Firm—Lewis H. Eslinger; Alvin Sinderbrand

[57] ABSTRACT

In an apparatus for reproducing digitized signals recorded in successive, substantially circular tracks on a rotated disc by means of a pickup of the optical type which, in a normal scanning state, scans the tracks in succession; a first or prepare-to-play command signal causes the pickup to reproduce the digitized signals for a predetermined interval corresponding to more than one of the tracks on the disc starting from a desired position on such one track and the digitized signals reproduced in that predetermined interval are stored, desirably in a random access memory (RAM), whereupon a standby state of the pickup is established in which the pickup traces a closed loop on the rotated disc within a range corresponding to the previously mentioned predetermined interval. Upon reception of a second or play command signal, the pickup is released from its standby state at the completion of the tracing of the closed loop during which the play command signal occurred and the normal scanning state of the pickup is reestablished. Further, in response to the second or play command signal, the stored digitized signals are read out from the RAM and transmitted, starting with the signals corresponding to the desired position irrespective of the rotational position of the disc at the time of the play command signal, and the digitized signals reproduced by the pickup on the reestablishment of its normal scanning state and, more particularly, commencing with the digitized signals following the predetermined interval, are sequentially stored in the RAM and then sequentially read out and transmitted therefrom.

11 Claims, 9 Drawing Figures

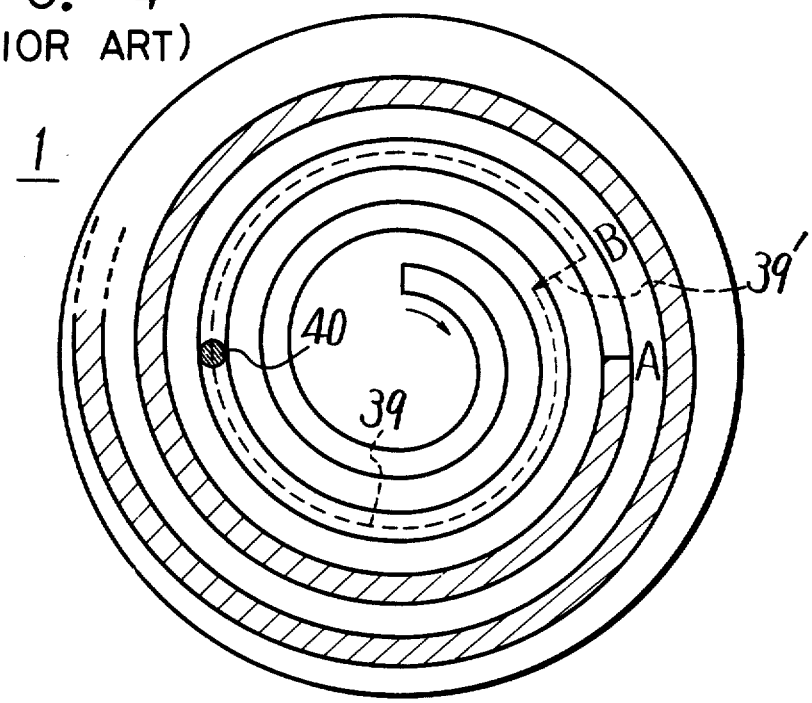
FIG. 4
(PRIOR ART)
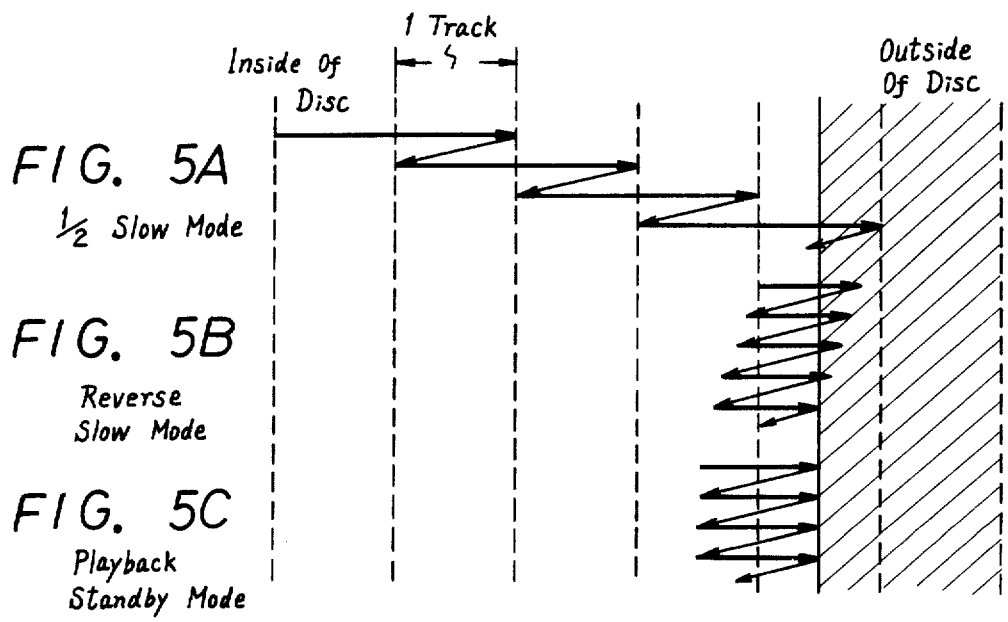
FIG. 5A
½ Slow Mode
FIG. 5B
Reverse Slow Mode
FIG. 5C
Playback Standby Mode

DISC REPRODUCING APPARATUS

BACKGROUND OF THE INVENTION

1. Field of the Invention

This invention relates generally to apparatus for reproducing signals recorded on a disc, and more particularly is directed to an improved digital audio disc player or reproducing apparatus.

2. Description of the Prior Art

Apparatus exists to reproduce or play back a digital audio disc, sometimes referred to as a compact disc, having digitized signals representing audio information and also disc position information recorded in successive, substantially circular tracks which may be successive turns of a continuous spiral path on the record disc or concentric circular tracks having respective different diameters. In one existing type of reproducing or playback apparatus for a digital audio disc, the latter is rotated by a spindle motor while a pickup device scans the disc and is moved radially, usually from the inner periphery toward the outer periphery of the disc surface, by a transporting mechanism which operates in synchronism with the rotation of the disc by the spindle motor. Further, a signal indicating the radial position of the pickup device is used to control the rotational speed of the spindle motor so that the rotational speed of the digital audio disc is varied to provide a constant linear speed at the position on the disc being scanned by the pickup device at all times.

In the case of a digital audio disc having a number of musical selections recorded in various respective groups of tracks on the disc, it is the usual practice to provide unrecorded areas, or at least areas that are not recorded with audio information, between the successive recorded musical selections. In a digital audio disc player of the prior art, when a desired musical selection is to be reproduced from a desired position at the beginning or within such music selection, a playback standby state is established in which the pickup device repeatedly scans or traces a single turn of the spiral path defining the successive substantially circular tracks and which terminates shortly before the desired position at which reproducing of the recorded digitized signals is to commence. If the digital audio disc player is released from such playback standby state in response to a play command signal, an indeterminant or variable delay occurs between such play command signal and the actual commencement of reproduced music or audio information. For example, in the case of a compact digital audio disc, the time required for the pickup device to trace or scan one track varies from 0.126 second, in the case of a track at the inner periphery of the recorded area of the disc, to 0.292 second, in the case of a track at the outer periphery of the recorded disc area. Accordingly, there will be a variable delay ranging up to a maximum of 0.292 second from the occurrence of the play command signal until the commencement of actual reproduction of audio information or music, with the extent of such delay depending upon the radial position on the disc then being scanned by the pickup device, and also on the rotational or angular distance between the point on the disc being scanned by the pickup device at the time when the play command signal occurs and the circumferential position along a track at which the desired music selection actually commences. Although such delay of indefinite length does not pose a serious problem in the general use of the digital audio disc, it may be quite disadvantageous when digital audio discs are employed at broadcasting stations, in which case so called "dead time" in the broadcast transmission is to be avoided. Further, as a practical matter, digital audio discs have digitized signals recorded thereon for representing the playing time of following recorded musical selections. Therefore, the point of "playing time zero" which precedes each group of digitized playing time signals is not coincident with the actual commencement of the recorded audio or music signals. Thus, even if a music selection is played back precisely from its point of "playing time zero", a soundless period of indefinite length will occur prior to the actual playback of music, and such soundless period again causes a problem in the use of digital audio discs by broadcasting stations.

OBJECTS AND SUMMARY OF THE INVENTION

Accordingly, it is an object of the present invention to provide an apparatus, such as, a digital audio disc player, for reproducing digitized signals recorded in successive, substantially circular tracks on a rotated disc, and which avoids the above described problems inherent in the prior art.

More particularly, it is an object of this invention to provide an apparatus for reproducing digitized signals recorded in successive, substantially circular tracks on a rotated disc, and in which the playback of a desired portion of the recorded signals can be started substantially instantaneously, at any desired time, irrespective of the rotational position of the disc relative to the pickup device at that time.

Another object is to provide an apparatus, as aforesaid, in the form of a digital audio disc player which can start to play a desired musical selection starting from a selected position on the disc substantially instantaneously upon the receipt of a play command signal, whereby to avoid the occurrence of a silent period between such play command signal and the actual playback of music so that the digital audio disc player may be advantageously employed for music reproduction by broadcasting stations.

According to an aspect of this invention, an apparatus for reproducing digitized signals recorded in successive, substantially circular tracks on a rotated disc comprises pickup means having a normal scanning state for reproducing the digitized signals by scanning the tracks in succession, memory means, means responsive to a first or prepare-to-play command signal for causing the pickup means to reproduce the digitized signals for a predetermined interval corresponding to more than one of the tracks starting from a desired position on such one track while the memory means stores the digitized signals reproduced in said predetermined interval, pickup position control means conditioned by the first or prepare-to-play command signal to establish, after the digitized signals reproduced in said predetermined interval are stored in the memory means, a standby state of the pickup means in which the latter traces a closed loop on the rotated disc within a range corresponding to said predetermined interval, the pickup position control means being conditioned by a second or play command signal for releasing the pickup means from its standby state at the completion of the tracing of the closed loop during which the second command signal occurs and for then reestablishing the normal scanning state, and means responsive to the second or play command signal for reading out and transmitting the digitized signals stored in the memory means starting with the signals corresponding to the desired position on said one track irrespective of the rotational position of the disc at the time of the second command signal, and for sequentially storing in the memory means and then sequentially reading out and transmitting therefrom the digitized signals reproduced by said pickup means on the reestablishment of the normal scanning state and which commence with the digitized signals following the predetermined interval.

The above, and other objects, features and advantages of the invention, will be apparent in the following detailed description of an illustrative embodiment of the invention which is to be read in connection with the accompanying drawings forming a part hereof, and in which the same reference numerals are used to identify like parts in the several views.

BRIEF DESCRIPTION OF THE DRAWINGS

FIG. 3 is a block diagram showing a demodulating circuit used for demodulating the reproduced signals in the prior art player of FIG. 1;

FIG. 4 is a diagrammatic plan view showing successive, substantially circular tracks in which digitized signals are recorded in a digital audio disc, and to which reference will be made in explaining the operation and problems associated with the player according to the prior art;

FIGS. 5A, 5B and 5C are diagrams to which reference will be made in explaining playback operation of a digital audio disc player of a type to which the present invention is advantageously applied;

FIGS. 8A to 8D are timing charts useful in understanding the operation of the circuit of FIG. 6.

DESCRIPTION OF THE PREFERRED EMBODIMENT

Figure 1:
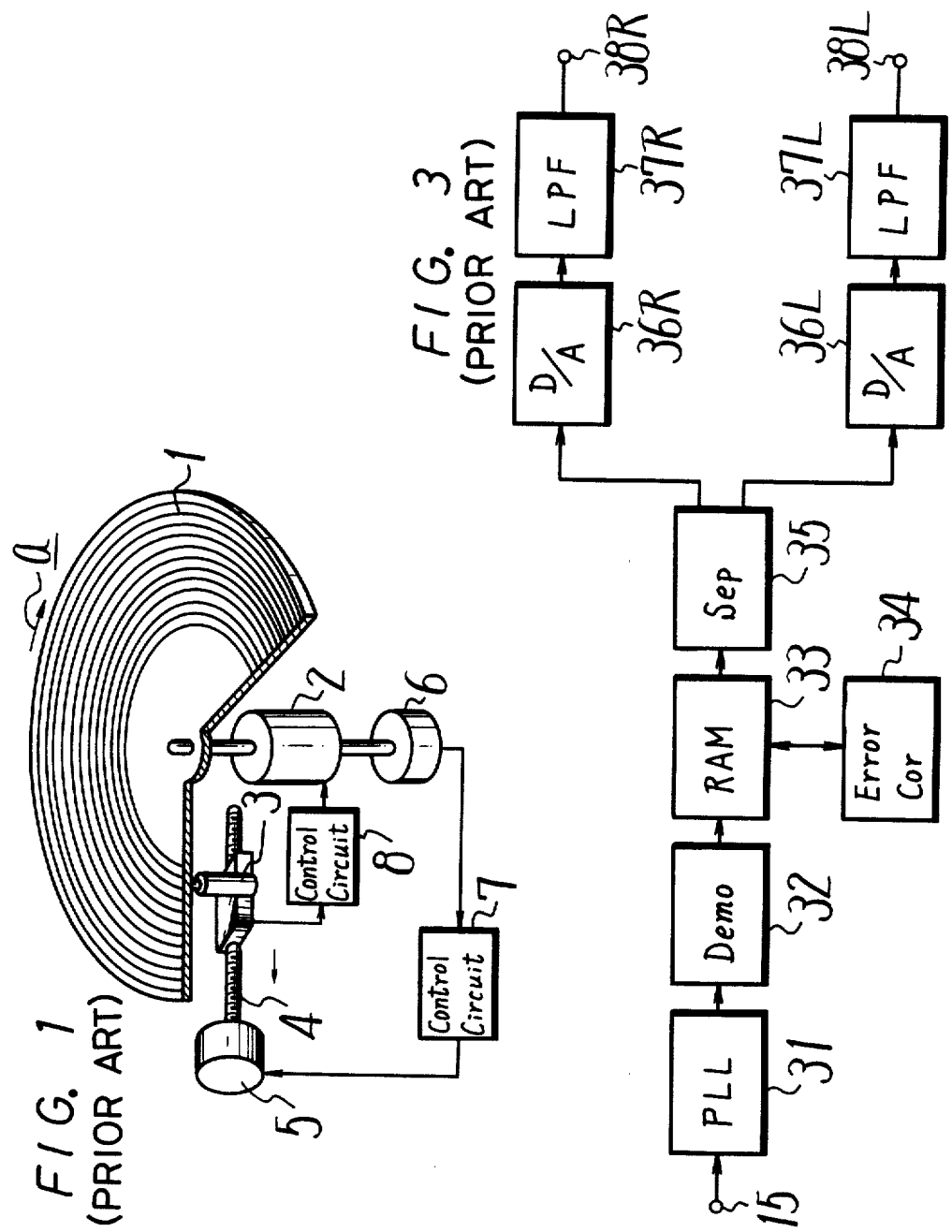
FIG. 1 is a schematic perspective view showing a digital audio disc player according to the prior art, with the disc being partly broken away.

Initially, reference is made to FIG. 1 of the drawings for its showing of a digital audio disc player of a known type to which the present invention may be advantageously applied. In the player of FIG. 1, a digital audio disc 1 is rotated by a spindle motor 2 in the direction of the arrow a, for example, in the counterclockwise direction as viewed from the underside of disc 1. Digitized signals, for example, representing music or audio information and disc position information, are conventionally recorded in successive, substantially circular tracks which, as shown on FIG. 4, may be successive turns of a spiral path on the disc 1. Alternatively, the successive tracks in which the digitized signals are recorded on disc 1 may be concentric circles of respective different diameters.

A pickup device 3 is located under disc 1 and, in a normal scanning state, pickup device 3 is moved or transported radially, as a unit, in respect to rotated disc 1, usually in the direction from the inner periphery to the outer periphery of the recorded area on disc 1, so as to reproduce the recorded digitized signals by scanning the tracks in succession. Such movement of pickup device 3, as a unit, is effected by a worm or screw 4 which is driven by a motor 5. In order that the movement of pickup device 3 by screw 4 will be synchronized with the rotation of disc 1, a rotation detecting device 6, for example, in the form of a frequency generator, is coupled with spindle motor 2 for providing an output signal at a frequency corresponding to the rotational speed of disc 1. Such signal from frequency generator 6 is applied to a control circuit 7 for motor 5 whereby the latter turns screw 4 a predetermined amount for each revolution of digital audio disc 1 so as to cause pickup device 3 to scan the successive turns of the spiral path constituting the tracks in which the digital signals are recorded on disc 1. Further, as is known, a signal indicating the radial position of pickup device 3 in respect to disc 1 is suitably supplied to a control circuit 8 by which the rotational speed of spindle motor 2 is varied in accordance with the radial position on disc 1 at which pickup device 3 is scanning the same, whereby to achieve a constant linear velocity of the disc at the scanned location.

Figure 2:
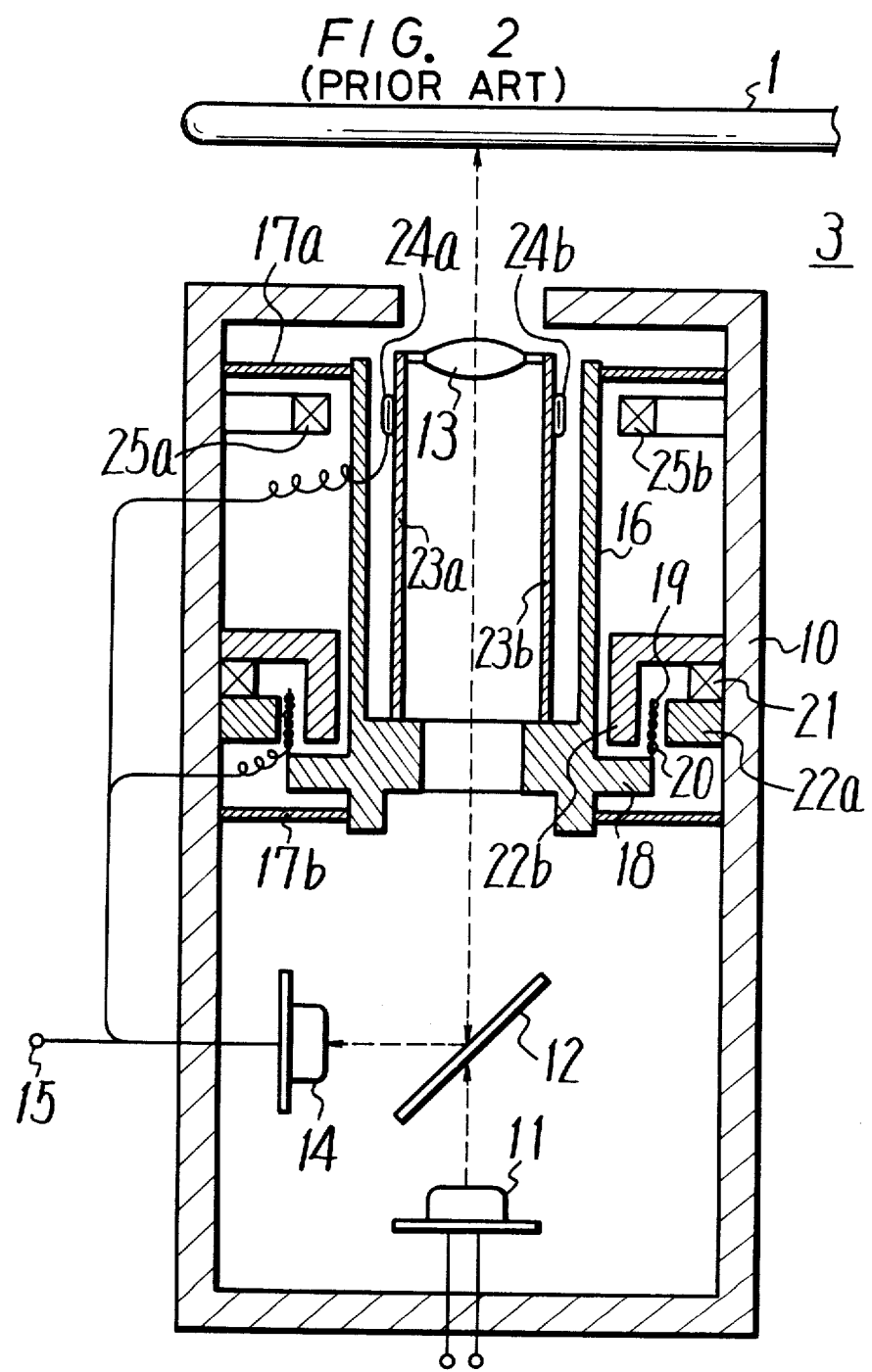
FIG. 2 is a schematic vertical sectional view showing an optical pickup device of the prior art player of FIG. 1 for reproducing signals recorded on the digital audio disc.

Referring now to FIG. 2, it will be seen that the pickup device 3 may be of a known optical type which comprises an outer casing 10 adapted to be moved or transported by the screw 4 of FIG. 1 and housing a laser light source 11, for example, constituted by a semi-conductor laser. The laser light beam emitted from source 11 is conducted upwardly through a beam splitter 12 to an objective lens 13 by which the light beam is focused as a light beam spot at the surface of digital audio disc 1 on which the digitized signals are recorded, for example, in the form of pits or depressions arrayed along the record tracks. The light beam reflected from a surface of digital audio disc 1, and hence modulated by the digitized signals recorded in the track being scanned, passes downwardly through objective lens 13 and is reflected by beam splitter 12 so as to be received by a photo-detector assembly 14. In response to the modulation of the reflected light beam with the recorded digitized signals in the track being scanned, photo-detector assembly 14 provides a corresponding electrical output signal to an output terminal 15. Further, as is known, the reflected light beam received by photo-detector assembly 14 may provide information in respect to the focusing of the light beam at the surface of disc 1 and also information in respect to tracking errors of the laser light beam, that is, the extent to which the light beam spot is centered in the transverse direction relative to the track being scanned. For the purposes of the present disclosure, it is sufficient to note that photo-detector assembly 14 responds to such focusing and tracking error information for providing corresponding focusing and tracking servo control signals, respectively, by which objective lens 13 is moved axially, that is, in the vertical direction, for suitably adjusting the focusing of the laser light beam in respect to disc 1, and further by which objective lens 13 is moved in the radial direction of disc 1, that is, in the direction transverse in respect to the tracks, so as to compensate for any tracking errors.

In order to permit the above described movements of objective lens 13, the mounting for lens 13 is shown to include a cylinder 16 arranged within casing 10 so as to have its axis extending vertically, and being supported, at its upper and lower ends, by springs 17a and 17b, respectively, extending from casing 10. Thus, mounting cylinder 16 is movable in the vertical direction of its axis relative to outer casing 10. A flange 18 extends radially outward from the lower end portion of mounting cylinder 16 and, at its outer periphery, is secured to an upwardly directed cylindrical bobbin 19 which is coaxial with mounting cylinder 16. A focusing servo coil 20 is wound circumferentially about bobbin 19 for cooperation with a magnetic field produced by a permanent magnet 21 secured within outer casing 10. Yokes 22a and 22b of magnetic material extend from the opposite poles of magnet 21 and have opposed end surfaces defining an annular gap therebetween in which coil 20 is movably accommodated. It will be appreciated that, when the focusing servo control signal is applied to coil 20, the resulting current cooperates with the magnetic flux in the gap between yokes 22a and 22b for moving mounting cylinder 16, and hence lens 13, in the axial direction.

Objective lens 13 is shown to be supported in respect to mounting cylinder 16 by means of a pair of parallel plate or leaf springs 23a and 23b which are secured, at their lower ends, to a lower end portion of cylinder 16 and extend upwardly therefrom, with the objective lens 13 being supported between the upper ends of springs 23a and 23b. Tracking servo coils 24a and 24b, which are wound so as to lie in substantially vertical planes against springs 23a and 23b, respectively, are secured to the upper end portions of such springs. Permanent magnets 25a and 25b are fixedly mounted within casing 10 at the outside of mounting cylinder 16 in positions opposite coils 24a and 24b. Thus, when the previously mentioned tracking servo control signal is applied to coils 24a and 24b, the resulting currents flowing therethrough cooperate with the magnetic fields of magnets 25a and 25b for moving leaf springs 23a and 23b, and hence objective lens 13, either toward the left or toward the right, as viewed on FIG. 2, with the amount of such movement depending upon the magnitude of the tracking servo control signal.

It will be appreciated that, in the pickup device 3 described with reference to FIG. 2, the application of the focusing servo control signal to coil 20 ensures that the laser light beam emitted from source 11 will, at all times, be accurately focused by objective lens 13 at the surface of disc 1 on which the digitized signals are recorded, while the application of the tracking servo control signal to coils 24a and 24b ensures that the optical axis of objective lens 13 will be made coincident with the median of the scanned track on disc 1 in which the digitized signals are recorded in the form of a series or array of pits or bumps.

Referring now to FIG. 3, it will be seen that, in the digital audio disc player being described, the reproduced output signal applied by photo-detector assembly 14 to output terminal 15 is supplied from the latter to a phaselocked loop (PLL) circuit 31 in which any phase fluctuations of the reproduced signal are removed. The phase-stabilized output of circuit 31 is delivered to a demodulator 32 which provides a digital information signal. This digital information signal is applied from demodulator 32 to a random access memory (RAM) 33 for storage or memorizing in the latter while any error appearing in the digital information signal is corrected or compensated for by an associated error correction circuit 34. The resulting error-corrected signal is read out of RAM 33 to a separation circuit 35 in which the left-channel signal and right-channel signal are separated from each other and applied to digital-to-analog (D/A) converters 36L and 36R, respectively. The analog left-channel signal and right-channel signal obtained from converters 36L and 36R are respectively delivered through low-pass filters 37L and 37R to output terminals 38L and 38R from which the signals can be supplied through suitable amplifiers to respective loud speakers for playing back the music or other audio signals that were recorded on disc 1.

In the above described prior art digital audio disc player, when a particular musical selection recorded in a group of successive tracks on disc 1 is to be reproduced or played back from its beginning or from any other desired position indicated at A on FIG. 4, and referred to as the point of "playing time zero", a playback standby state of the digital audio disc player is established in which pickup device 3 repeatedly scans or traces a closed loop indicated in broken lines at 39 on FIG. 4. Such closed loop 39 encompasses a single turn of the spiral path defining the successive substantially circular tracks and which terminates at B shortly before the desired position A at which reproducing or playback of the recorded digitized signals is to commence. It will be appreciated that, in such playback standby state, the rotation of screw 4 by motor 5 for transporting pickup device 3, as a unit, may be continued to cause the light beam spot represented by the shaded area 40 on FIG. 4 to follow the increasing radius of the turn of the spiral path being scanned until the point B on such path is attained. At the instant when such point B is scanned by light beam spot 40, a suitable signal may be applied to coils 24a and 24b for causing the light beam spot to jump, as indicated at 39', from the point B on one turn to a similarly located point on the next inner turn. If the described digital audio disc player is released from its playback standby state in response to a play command signal, an indeterminant or variable delay occurs between such play command signal and the actual commencement of reproducing of music or audio information at the desired position A. For example, if the play command signal occurs at a time when the light beam spot 40 is scanning the closed loop 39 at a location on the disc 1 approximately diammetrically opposed from the desired position A, then approximately one-half revolution of the disc 1 will occur between the play command signal and the actual commencement of the reproducing of music or audio information at position A. As earlier noted in the case of a compact digital audio disc, the time required for the pickup device 3 to trace or scan one track or turn of the spiral path varies from 0.126 second, in the case of a track at the inner periphery of the recorded disc area, to 0.292 second, in the case of a track at the outer periphery of the recorded disc area. Thus, the delay between the occurrence of the play command signal and the actual commencement of playback of music or audio information may vary substantially up to a maximum of 0.292 second. The extent of such delay depends upon the radial position on the disc being scanned by the pickup device and also on the rotational or angular distance between location of the light beam spot 40 on the disc at the time when the play command signal occurs and the position A at which the desired musical selection or audio information actually commences. Accordingly, if the known digital audio disc player is employed for broadcasting purposes, the delay between the occurrence of a play command signal and the actual commencement of the reproduction of music or audio information will undesirably result in "dead time" in the broadcast transmission.

Further, in the operation illustrated on FIG. 4, the circumferential distance between the positions A and B represents the minimum delay that can occur between the play command signal and the actual commencement of the playback of music or audio information. Therefore, the present invention is preferably applied to a digital audio disc player of the type disclosed in our copending U.S. patent application Ser. No. 06/409,120, filed Aug. 18, 1982 which corresponds to Japanese Patent Application No. 131,909/81, filed Aug. 21, 1981, and the disclosure of which is incorporated herein by reference. In such preferred digital audio disc player, operations of which will be hereinafter described with reference to FIGS. 5A–5C, the desired position A at which reproduction of a music selection on the disc is to be commenced can be accurately determined and the playback standby state can be accurately established with reference to such desired position. More particularly, in FIGS. 5A–5C, successive tracks of a digital audio disc 1 are represented by the vertical dotted lines, with the track indicated at the left-hand side of the drawing being at the inner periphery of the disc, while the track represented at the right-hand side of the drawing is at the outer periphery of the disc. The spaces between adjacent vertical dotted lines each represent the pitch or distance between adjacent tracks, that is, one revolution of the disc, and the cross-hatched area at the right-hand side of the drawing represents an area on the disc in which audio information, such as, music, is recorded.

In a slow-playback mode of the preferred player or reproducing apparatus indicated on FIG. 5A, pickup device 3 is made to scan two tracks in succession, for example, through the movement of pickup device 3 as a unit by screw 4, and then the position of the light beam spot on the disc is deflected or returned in the reverse direction by one track or pitch, for example, as by the application of a suitable signal to coils 24a and 24b on FIG. 2. In the slow-playback mode illustrated on FIG. 5A, the cycle of scanning two tracks and then returning the light beam spot by one track is repeated so that, in effect, the light beam spot scans along the successive tracks at one-half the normal speed or rate.

In a reverse slow-playback mode of the preferred reproducing apparatus or player, for example, as illustrated in FIG. 5B, the pickup device 3 is moved by screw 4 in the outward direction through a distance which is less than the distance between adjacent tracks, so as to scan $(T-\alpha)$, where T is one track, and then the light beam spot is moved in the reverse direction by the pitch or distance between adjacent tracks, with such cycle of movements being repeated so that, during each revolution of disc 1, the point on the spiral path at which the light beam spot 40 (on FIG. 4) scans the disc moves rearwardly along the track (that is, in the counterclockwise direction as viewed on FIG. 4) by the distance $\alpha$.

Further, as shown on FIG. 5C, the reproducing apparatus or player can operate in a playback standby mode in which, during one revolution of disc 1, pickup device 3 is moved, for example, as a unit, by screw 4, in the outward direction through a distance equal to the distance or pitch between adjacent tracks and, at the end of such revolution, a suitable signal applied to coils 24a and 24b causes deflection or movement of the light beam spot in the reverse direction by the same distance.

In employing the above described slow-playback mode and reverse slow-playback mode for determining the precise beginning of the recorded music or other audio information can be reproduced, the slow-playback mode (FIG. 5A) is initially established to scan the successive tracks at a slow rate until the existence of the music or other audio signal is detected, either audibly through its reproduction, or automatically by detecting a predetermined silent or soundless pattern of digital signals which identify the commencement of the music selection or audio information. At that point, the reverse slow-playback mode is established to relatively slowly back up the effective position of the light beam spot along a turn of the spiral path until the music or audio information is no longer reproduced, whereupon the playback standby mode is established, as on FIG. 5C, and in which the light beam spot repeatedly scans or traces the closed loop indicated in broken lines at 39'' on FIG. 7, and which corresponds to the turn of the spiral path ending precisely at the desired position A' at which the reproducing of the music or audio information is to commence.

Figure 7:
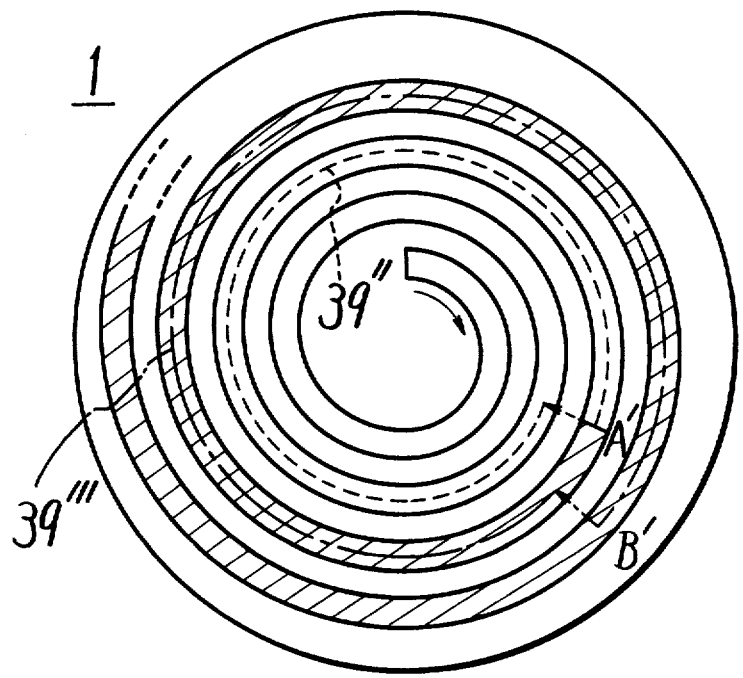
FIG. 7 is a diagrammatic view of a disc similar to that of FIG. 4, but to which reference will be made in explaining the operation of a digital audio disc player provided with the circuit of FIG. 6 according to this invention.

However, even if the playback standby state is established, as shown at FIG. 5C and in broken lines at 39'' FIG. 7, an indefinite delay may still occur between the occurrence of a play command signal and the actual commencement of the playback or reproducing of music at the desired position A' on FIG. 7. In other words, the play command signal is likely to occur at a time when the light beam spot is positioned along the closed loop indicated in broken lines at 39'' at some indeterminant distance from the desired position A'.

Figure 6:
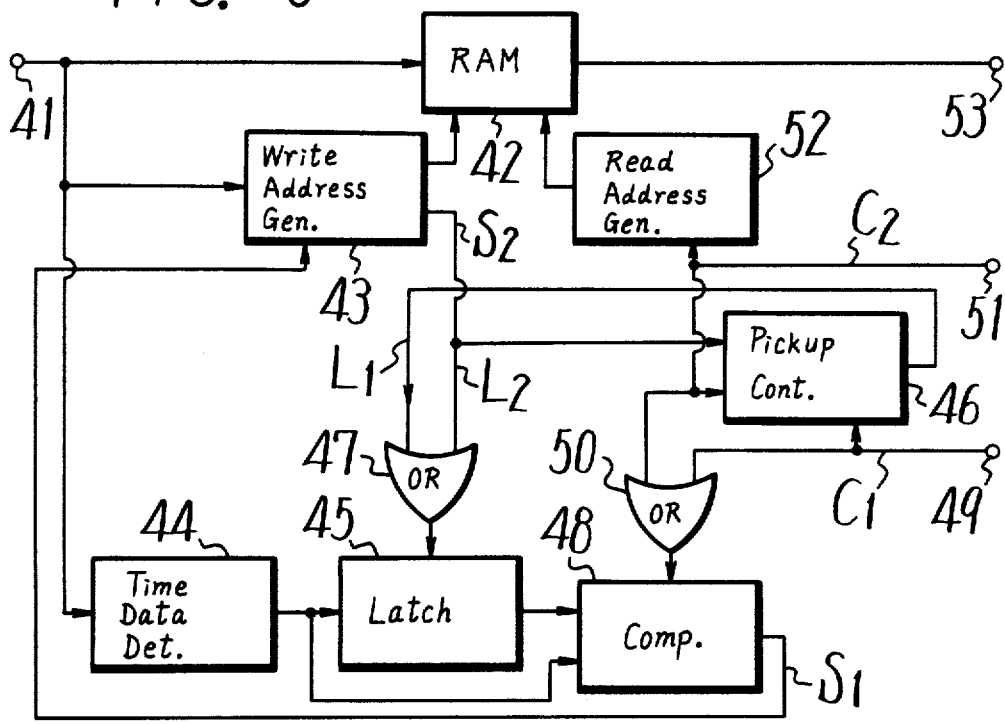
FIG. 6 is a block diagram showing a circuit according to an embodiment of the present invention which may be advantageously used in connection with the digital audio disc player of FIGS. 1-3.

For avoiding the foregoing problem, that is, in order to make possible the commencement of the actual playback or reproducing of the recorded music or other audio information substantially instantaneously in response to a play command signal, the digitized signals constituting the output at terminal 15 of pickup device 3 are applied to an input terminal 41 of a signal processing circuit shown on FIG. 6. In such signal processing circuit according to this invention, the digitized signals are supplied from terminal 41 to a random access memory (RAM) 42, a write address generator 43 and a playing time data detector 44. Thus, the digitized signals in the output of pickup device 3 which represent time data, that is, units of time along the successive tracks on disc 1, are detected by playing time data detector 44 and applied from the latter to a latch circuit 45. Circuit 45 is made operative to latch or memorize the output of time data detector 44 in response to a latching signal $L_1$ supplied from a pickup device control circuit 46 through an OR circuit 47. Pickup device control circuit 46, which may include a CPU, supplies latching signal $L_1$ at each instant when, in a first or prepare-to-playback standby state, circuit 46 applies a pulse or signal to coils 24a and 24b for causing the light beam spot to move radially inward by one track pitch from the position A'. Thus, in response to latching signal $L_1$, latch circuit 45 is made to latch or memorize the final detected time data identifying the soundless part of the record track immediately in advance of the desired position A'.

The time data latched or memorized in latch circuit 45 and the time data detected continuously by time data detector 44 are supplied to respective inputs of a comparison circuit 48 which is adapted to be made operative for providing a coincidence signal $S_1$ as its output when the time data applied to its inputs coincide. More particularly, comparison circuit 48 is alternatively made operative by a first or prepare-to-play command signal $C_1$ applied thereto from an input terminal 49 through an OR circuit 50 or by a second or play command signal $C_2$ applied to OR circuit 50 from an input terminal 51.

The first or prepare-to-play command signal $C_1$ is also applied to pickup device control circuit 46 to cause change-over of pickup device 3 from its first or prepare-to-playback standby state, in which the light beam spot repeatedly traces the closed loop indicated in dotted lines 39'' on FIG. 7, to a second or playback standby state in which the light beam spot is made to repeatedly trace the closed loop indicated in dot-dash lines at 39''' on FIG. 7.

The coincidence signal $S_1$ from comparison circuit 48 is shown to be applied to a control terminal of write address generator 43 so that, upon the occurrence of such coincidence signal $S_1$, generator 43 provides successive addresses to RAM 42 for the writing or storing at such addresses of respective digitized signals being applied to input terminal 41 from pickup device 3. Further, address generator 43 is operative, when it generates the final address of RAM 42, to provide a signal $S_2$ to pickup device control circuit 46 by which the latter changes-over pickup device 3 from its first or prepare-to-playback standby state to its second or playback standby state. Such signal $S_2$ from write address generator 43 is also applied, as a latching signal $L_2$, through OR circuit 47 to latching circuit 45 whereby the latter is then made operative to latch or memorize the final time data detected by detector 44 and corresponding to the position B' in which is recorded the digitized signals stored in the final address of RAM 42.

The play command signal $C_2$ applied to input terminal 51 is also supplied therefrom to a control terminal of a read address generator 52 for actuating the latter to supply successive read addresses to RAM 42 by which the digitized signals previously stored at such addresses are sequentially read out to an output terminal 53, from whence the digitized signals or data can be applied to the earlier described known circuit shown on FIG. 3. The play command signal $C_2$ is further applied to the pickup device control circuit 46 by which the pickup device 3 is released from its second or playback standby state at the completion of the tracing of the closed loop indicated at 39''' on FIG. 7 during which the play command $C_2$ occurred. Then, pickup device control circuit 46 reestablishes the normal scanning of the pickup device 3, that is, the pickup device 3 is moved continuously outward by screw 4 with the light beam spot scanning successive turns of the spiral path, and with coils 24a and 24b receiving the tracking servo control signal for ensuring the accurate scanning of the path.

FIGS. 8A to 8D illustrate the relationship among first and second command signals $C_1$ and $C_2$, coincidence signal $S_2$ ($L_2$), and latching signal $L_1$. According to FIG. 8D, latching signal $L_1$ is generated when a pulse is supplied to coils 24a, 24b to cause the light beam spot from laser 11 to move radially inward one track pitch when the digital audio disc player is in the first or prepare-to-playback standby state. When the first command signal $C_1$ is supplied to pickup device control circuit 46, pickup device control circuit 46 causes change-over of pickup device 3 from its first or prepare-to-playback standby state to a second or playback standby state. Address generator 43 is operative, when it generates the final address of RAM 42, to provide a signal $S_2$ to pickup device control circuit 46 by which the latter changes over pickup device 3 from its first or prepare-to-playback standby state to its second or playback standby state. When play command signal $S_2$ is supplied to pickup device control circuit 46, pickup device 3 is released from its second or playback standby state whereby normal scanning of pickup device 3 is established, as described hereinbefore.

A digital audio disc player having a circuit according to the embodiment of the invention shown on FIG. 6 operates as follows:

Initially, through the use of the slow-playback mode and then the reverse slow-playback mode described above with reference to FIGS. 5A and 5B, the user precisely determines the location of the desired position A' at which the reproducing or playback of the recorded digitized signals is to commence, and the pickup device control circuit 46 is made to establish the first or prepare-to-playback standby state of pickup device 3 represented in FIG. 5C and in which the light beam spot repeatedly traces the closed loop 39'' on FIG. 7. In the course of tracing such closed loop 39'', each time the light beam spot scans the point immediately in advance of the desired position A', that is, simultaneously with the reverse movement of the light beam spot to the next inner track for continuing the tracing of closed loop 39'', control circuit 46 provides the latching signal $L_1$ which acts through OR circuit 47 to operate latch circuit 45 with the result that the latter latches or memorizes the time data representing the location immediately before desired position A'.

When the first or prepare-to-play command signal $C_1$ is applied to terminal 49, for example, by actuation of a suitable switch (not shown), such command signal $C_1$ acts through OR circuit 50 on comparison circuit 48 for causing the latter to compare the time data memorized in latch circuit 45 with the time data continuously issuing from time data; detector 44. Thus, after first command signal $C_1$ occurs, comparison circuit 48 provides the dence signal $S_1$ when the light beam spot next scans the location immediately before desired position A', that is, when the time data issuing from detector 44 next coincides with the time data memorized in latch circuit 45.

The first command signal $C_1$ further conditions pickup device control circuit 46 to release pickup device 3 from its first or prepare-to-playback standby state in which the light beam spot repeatedly scans closed loop 39'' on FIG. 7, and to permit the light beam spot, to continue scanning beyond the desired position A' along the respective track. Thus, when coincidence signal $S_1$ issues from comparison circuit 48 and causes write address generator 43 to operate, the digitized signals supplied to terminal 41, and which are reproduced by pickup device 3 commencing at the desired position A', are written sequentially in the respective addresses of RAM 42. The full sequence of addresses is produced by write address generator 43 in a predetermined interval during which disc 1 turns through a little more than one full revolution, for example, during which the light beam spot scans along the spiral path from the desired position A' to the position B'.

When the final address of RAM 42 is produced by generator 43, at which time, there will be stored in RAM 42 the digitized signals reproduced from disc 1 between the positions A' and B', the resulting signal $S_2$ from write address generator 43 causes pickup device control circuit 46 to establish the second or play standby state of pickup device 3. In such second standby state, the light beam spot repeatedly traces the closed loop 39''' on rotated disc 1 which is within a range corresponding to the predetermined interval of the reproduced digitized signals stored in RAM 42, that is, within the range between the positions A' and B'. The signal $S_2$ from write address generator 42 further acts, as latching signal $L_2$, through OR circuit 47 on latch circuit 45 to cause the latter to memorize the time data then issuing from detector 44, that is, the time data identifying the point or position B' at which is recorded the digitized signal stored in the final address of RAM 42.

With pickup device 3 in its second or playback standby state in which the light beam spot repeatedly traces or scans closed loop 39''', the application of the second or play command signal $C_2$ to terminal 51, for example, by closing of a suitable switch (not shown), is effective to immediately initiate operation of read address generator 52 by which the sequence of addresses is applied to RAM 42 for sequentially reading out the digitized signals or data stored in RAM 42, starting from the first address in the latter, that is, starting with the digitized signals recorded on disc 1 at the desired position A'. The digitized signals or data read out of RAM 42 are transmitted as the reproduced output at terminal 53, and it will be apparent that such reproduced or transmitted output commences with the signals recorded on the disc at the desired position A' irrespective of the position on the closed loop 39''' being scanned by the light beam spot at the instant when the play command signal $C_2$ is produced. Thus, the reproducing or playback of the recorded signals on the digital audio disc 1 commences substantially instantaneously in response to the play command signal.

The play command signal $C_2$ conditions pickup device control circuit 46 to release pickup device 3 from its second or playback standby state so that, at the completion of the tracing of the closed loop 39''' during which the play command signal $C_2$ occurred, the normal scanning state is reestablished and the light beam spot continues to scan along the spiral path beyond the position B'.

The application of play command signal $C_2$ through OR circuit 50 to comparison circuit 48 conditions the latter to compare the time data then memorized in latch circuit 45, that is, the time data corresponding to the position B', with the time data issuing from detector 44. Thus, after the occurrence of the play command signal $C_2$, when the light beam spot scans the position B', the resulting coincidence signal $S_1$ from comparison circuit 48 again initiates operation of write address generator 43 with the result that digitized signals then being reproduced from disc 1 starting at the position B', that is, immediately following the predetermined interval from A' to B', are written sequentially in vacated addresses of RAM 42 starting with the first address of the latter. After the read address generator 52 has been initially made operative by play command signal $C_2$ and the write address generator 43 has been thereafter made operative by coincidence signal $S_1$, such generators 43 and 52 operate repeatedly, that is, after producing the respective final address, each of the generators 43 and 52 again produces the respective first address.

From the foregoing, it will be appreciated that, in response to play command signal $C_2$, data corresponding to the digitized signals recorded on disc 1 from the desired position A' to the position B' are read out in sequence from RAM 42. In the course of such read out of the data initially stored in RAM 42, and more specifically when the light beam spot reaches the position B', data corresponding to the digitized signals recorded on disc 1 after the position B' are sequentially written in the vacant or open addresses of RAM 42. Such data newly written in RAM 42 are, in turn, sequentially read therefrom, that is, the writing and reading operations are repeatedly performed so that data corresponding to the recorded digitized signals starting from the desired position A' appear, without interruption, at output terminal 53 from the instant when the play command signal $C_2$ occurs.

In the above described embodiment of the invention, RAM 42 has to have a sufficient capacity to memorize the amount of data reproduced from disc 1 in the predetermined interval between positions A' and B', that is, reproduced in the time required for slightly more than one revolution of disc 1 when the light beam spot scans a record track near the outer periphery of the disc. Thus, in the case of the so-called "compact disc", the capacity of RAM 42 needs to be sufficient to memorize the data reproduced during slightly more than 0.292 second. In such compact disc, the recording format is comprised of time data (x x minutes x x.x seconds) formed of 4 bits×5 figures occurring at every 1/75 second, and data of 8 bits×32×98 frames. Accordingly, the number of bits of the data corresponding to 0.292 second, and therefore the required capacity of RAM 42, may be calculated as follows:

$$(4 \times 5 + 8 \times 32 \times 98) \frac{0.292}{1/75} = 547675.2$$

It will be appreciated that, when the true or actual commencement of a desired music selection on digital audio disc 1 is detected or accessed by identification of a soundless pattern in the record track immediately before the commencement of the music, such soundless pattern may be automatically detected to provide the command signal $C_1$ at terminal 49, whereby to automate the operation of the digital audio disc player through the establishment of the second or playback standby state.

Furthermore, in the event that the digitized signals recorded on disc 1 do not include time data, a precise rotary encoder may be coupled with the rotation of disc 1 to provide an output corresponding to the previously described time data, and which is supplied to latch circuit 45 and comparison circuit 48 so as to be similarly used in detecting the positions A' and B'.

Although an illustrative embodiment of this invention has been described in detail herein with reference to the drawings, it will be apparent that the invention is not limited to that precise embodiment, and that various changes and modifications may be effected therein by one skilled in the art without departing from the scope or spirit of the invention as defined in the appended claims.

What is claimed is:

1. Apparatus for reproducing digitized signals recorded in successive, substantially circular tracks on a rotated disc, comprising:

pickup means having a normal scanning state for reproducing said digitized signals by scanning said tracks in succession;

memory means;

first and second sources of first and second command signals, respectively;

means responsive to a first command signal from said first source for causing said pickup means to reproduce said digitized signals for a predetermined interval corresponding to more than one of said tracks starting from a desired position on said one track, and for causing said memory means to store said digitized signals reproduced by said pickup means in said predetermined interval;

pickup position control means conditioned by said first command signal to establish, after the digitized signals reproduced in said predetermined interval are stored in said memory means, a standby state of said pickup means in which the latter traces a closed loop on the rotated disc within a range corresponding to said predetermined interval, said pickup position control means being conditioned by a second command signal from said second source for releasing said pickup means from said standby state at the completion of the tracing of said closed loop during which said second command signal occurs and for then reestablishing said normal scanning state; and means cooperating with said means responsive to a first command signal and responsive to said second command signal for reading out and transmitting the digitized signals stored in said memory means starting with the signals corresponding to said desired position irrespective of the rotational position of the disc at the time of said second command signal, and for sequentially storing in said memory means and then sequentially reading out and transmitting therefrom the digitized signals reproduced by said pickup means on said reestablishing of said normal scanning state and which commence with the digitized signals following said predetermined interval.

2. Apparatus according to claim 1; in which said substantially circular tracks are successive turns of a spiral path on said disc.

3. Apparatus according to claim 1; in which said memory means includes a random access memory (RAM).

4. Apparatus according to claim 1; in which said digitized signals recorded on the disc represent audio information and disc position information; and in which said means for sequentially storing and then reading out and transmitting the digitized signals which commence with the digitized signals following said predetermined interval include timing means responsive to the digitized signals representing said disc position information.

5. Apparatus according to claim 4; wherein said memory means includes latch means for memorizing disc position information from said pickup means at the completion of said predetermined interval, and said timing means includes comparison means made operative in response to said second command signal for indicating coincidence between the disc position information memorized in said latch means and the disc position information being reproduced by said pickup means.

6. Apparatus according to claim 1; in which said pickup means includes an optical pickup device.

7. Apparatus according to claim 1; in which said digitized signals recorded on the disc represent audio information and disc position information; said memory means includes a random access memory (RAM) for storing the audio information and latch means for storing the disc position information, said latch means being actuated in response to a latch signal from said pickup position control means initially to store the disc position information corresponding to said desired position on said one track; and said means responsive to said first command signal includes comparison means made operative in response to said first command signal to provide a coincidence signal when the disc position information initially stored in said latch means coincides with the disc position information then being reproduced by said pickup means, write address generator means made operative by said coincidence signal to indicate successive addresses in said random access memory at which the audio information of the signals reproduced by said pickup means during said predetermined interval are stored, and means responsive to the final address produced by said write address generator means to cause said latch means to store the disc position information corresponding to the end of said predetermined interval.

8. Apparatus according to claim 1; in which said means responsive to said second command signal includes read address generator means actuated by said second command signal to indicate successive addresses in said random access memory from which the stored audio information are read out, and means through which said second command signal is applied to said comparison means to make the latter operative to provide a coincidence signal to said write address generator means when the disc position information being reproduced by said pickup means coincides with said disc position information stored in said latch means and which corresponds to said end of the predetermined interval, whereby said write address generator means causes storing, at the successive addresses in said random access memory, the reproduced audio information commencing following said predetermined interval.

9. A method for reproducing digitized signals recorded in successive, substantially circular tracks on a rotated disc scanned in succession by a pickup in a normal scanning state thereof, comprising the steps of:

supplying a first command signal to cause said pickup to reproduce said digitized signals for a predetermined interval corresponding to more than one of said tracks starting from a desired position on said one track;

memorizing said digitized signals reproduced by said pickup in said predetermined interval;

after the digitized signals reproduced in said predetermined interval are stored in said memory means, generating a signal to establish a standby state of said pickup in which the latter traces a closed loop on the rotated disc within a range corresponding to said predetermined interval;

releasing said pickup from said standby state at the completion of the tracing of said closed loop during which a play command is received and for then reestablishing said normal scanning state;

reading and transmitting the memorized signals starting with the signals corresponding to said desired position irrespective of the rotational position of the disc at the time of said play command; and sequentially memorizing and then sequentially reading and transmitting the digitized signals reproduced by said pickup on said reestablishing of said normal scanning state and which commence with the digitized signals following said predetermined interval.

10. A method according to claim 9; in which a random access memory is addressed for said memorizing and said reading and transmitting of the digitized signals.

11. A method according to claim 9; in which said digitized signals recorded on the disc represent audio information and disc position information; and in which said sequential memorizing and then reading and transmitting of the digitized signals which commence with the digitized signals following said predetermined interval are timed with reference to the digitized signals representing said disc position information.

* * * * *